United States Patent
Nilsson

(10) Patent No.: US 8,225,749 B2
(45) Date of Patent: Jul. 24, 2012

(54) CUBICLE, ARRANGEMENT IN A CUBICLE AND A METHOD FOR MOUNTING SAID ARRANGEMENT

(75) Inventor: Staffan Nilsson, Alvsjo (SE)

(73) Assignee: DeLaval Holding AB, Tumba (SE)

( * ) Notice: Subject to any disclaimer, the term of this patent is extended or adjusted under 35 U.S.C. 154(b) by 111 days.

(21) Appl. No.: 12/669,066

(22) PCT Filed: Aug. 22, 2008

(86) PCT No.: PCT/SE2008/050955
§ 371 (c)(1),
(2), (4) Date: Jan. 14, 2010

(87) PCT Pub. No.: WO2009/029030
PCT Pub. Date: Mar. 5, 2009

(65) Prior Publication Data
US 2010/0186678 A1    Jul. 29, 2010

(30) Foreign Application Priority Data
Aug. 30, 2007 (SE) .................................. 0701957

(51) Int. Cl.
*A01K 1/15* (2006.01)
(52) U.S. Cl. ..................................... 119/526; 119/525
(58) Field of Classification Search .................. 119/444, 119/446, 507, 516, 523, 525, 526, 528, 529, 119/530; *A01K 1/02, 1/00*
See application file for complete search history.

(56) References Cited

U.S. PATENT DOCUMENTS

| | | | |
|---|---|---|---|
| 2,227,581 A | 1/1941 | Henderson | |
| 2,720,861 A | 10/1955 | Stroup et al. | |
| 4,129,097 A * | 12/1978 | Schwartzkopff et al. | 119/526 |
| 6,079,366 A * | 6/2000 | Telleen | 119/525 |
| 6,230,658 B1 | 5/2001 | Rudolph | |
| 6,269,768 B1 * | 8/2001 | Zartman | 119/28.5 |
| 6,467,434 B1 * | 10/2002 | Dejonge et al. | 119/516 |
| D520,191 S * | 5/2006 | Staal | D30/119 |
| 2003/0121479 A1 * | 7/2003 | de Jonge et al. | 119/523 |

FOREIGN PATENT DOCUMENTS

| | | |
|---|---|---|
| DE | 296 21 546 U1 | 3/1997 |
| WO | WO 93/15601 A1 | 8/1993 |
| WO | WO 94/15452 A1 | 7/1994 |

OTHER PUBLICATIONS

International Search Report, dated Nov. 27, 2008, from corresponding PCT application.

* cited by examiner

*Primary Examiner* — David Parsley
*Assistant Examiner* — Thien Thanh Pham
(74) *Attorney, Agent, or Firm* — Young & Thompson

(57) ABSTRACT

A cubicle (10) for an animal, a system for an arrangement within the cubicle and a method for mounting said arrangement. The cubicle (10) has an open side (12) though which the animal enters the cubicle (10) and an opposite end for the animal's head. The cubicle (10) includes a brisket board (13) for positioning the animal in the right position within the cubicle (10) and a mattress (16) placed on a cubicle floor (14) for the animal to rest on. One side of the mattress (16), and one side of the brisket board (13) are secured to the cubical floor (14) by an elongated profile (25) securing both the mattress (16) and the brisket board (13) to the floor (14).

9 Claims, 4 Drawing Sheets

CUBICLE, ARRANGEMENT IN A CUBICLE AND A METHOD FOR MOUNTING SAID ARRANGEMENT

FIELD OF THE INVENTION

The present invention relates to a cubicle for animals, an arrangement in the cubicle and a method for mounting said arrangement.

BACKGROUND OF THE INVENTION

Barns in which animals are allowed to move around freely are well known in the art and frequently used all around the world. In the barn, cubicles large enough to house one animal are arranged within the barn. The cubicles are used by one animal at a time as an area where the animal can lay down and rest. One arrangement for defining cubicles within a barn is disclosed in U.S. Pat. No. 6,230,658 B1. The animal, for example a cow, is normally entering the cubicle by moving forwardly into the cubicle so that the head is positioned inwards, and the rear of the animal is placed towards the entrance of the cubicle. In order to position the animal correctly in the longitudinal direction within the cubicle a brisket board is arranged on the cubicle floor. When the animal lies down on the floor, the brisket board is in contact with, or placed close to, the animal chest in order to ensure that the animal does not lay down to far into the cubicle. A correct positioning of the animal is important to ensure that urine and defecate from the animal end up in the therefore intended area outside the cubicle.

The floor in the barn is normally made of concrete which is hard and during cold days very uncomfortable for the animal to rest on. It has been verified that cows living in a comfortable environment produce more milk. The floor in the cubicle is therefore often covered by an animal mattress in order to reduce the cold feeling when lying on the floor, and to provide a more comfortable environment for the animal. Different types of animal mattresses for use on the floor in a cubicle are disclosed in EP 0 684 760 B1.

The known brisket boards, and mattresses, are however time consuming to mount on the cubicle floor in a proper way and the object of the present invention is therefore to provide an arrangement that is considerably easier to mount.

SUMMARY OF THE INVENTION

The problem disclosed above is solved by the present cubicle and arrangement defined in the independent claims 1 and 9. Furthermore is a method for mounting the claimed arrangement defined in independent claim 15.

The claimed cubicle has an open side through which the animal enters the cubicle, and an opposite end for the animal head. The cubicle comprises a brisket board for positioning the animal longitudinally within the cubicle and a mattress placed on the cubicle floor. One head end of the mattress and one longitudinal edge of the brisket board are secured to the cubicle floor by an elongated profile secured in the floor securing both the mattress and the brisket board to the floor.

The mounting of the brisket board and the mattress is facilitated considerably since the elongated profile is used both for securing one side of the mattress and the brisket board. The number of bolts that have to be secured in the concrete floor is thereby reduced considerably. Furthermore, the claimed invention does provide a precise positioning of the mattress and the brisket board side by side on the cubicle floor. Another advantage is that the top surface of the brisket board, the elongated profile and the animal mattress is substantially smooth which is nice for the animal resting in the cubicle. This arrangement also facilitates cleaning of the cubicle since there are fewer areas that are difficult to clean.

In an exemplary embodiment of the claimed invention, the profile, the secured side of the mattress and the brisket board extend across substantially the entire width of the cubicle. This arrangement ensures a reliably securing of the mattress and the brisket board along substantially the entire side of the mattress and the brisket board within the cubicle.

In an exemplary embodiment, the brisket board cross-sectional shape is substantially triangular and rests against the floor. A flange, or a number of singular protrusions, extends from brisket board adjacent the floor along substantially the entire length of the brisket board.

In a further exemplary embodiment the elongated profile has a longitudinal side provided with or forming a recess extending along the entire side of the profile.

The flange, or the number of singular protrusions, of the brisket board is fitted within the profile recess and a second flange, or a second number of singular protrusions, extend from the brisket board adjacent the floor along an opposite side of the brisket board. At least two fastening means, such as screws, or bolts, secure the second flange, or the second number of singular protrusions, of the brisket board to the floor and secure the brisket board so that the first flange, or number of singular protrusions, is kept in the recess. This arrangement provides a reliable securing of the mattress and the brisket board that is quickly mounted within the cubicle. Furthermore, the arrangement makes it easy to remove the brisket board since only the fastening means securing the second flange, or second number of singular protrusions, have to be removed in order to disengage the brisket board from the profile.

The arrangement is mounted according to the different steps defined in the method claimed in independent claim 15 comprising the following steps:
  securing one side of the mattress to the cubicle floor with a profile secured to the floor by at least two fastening means, such as screws or bolts;
  inserting a brisket board flange, or a number of singular protrusions, in a recess in the profile, or a recess generated by the profile; and
  securing the brisket board in the cubicle floor so that the flange, or number of singular protrusions, inserted in the recess is not allowed to slip out of engagement with the elongated profile.

The present method for mounting the brisket board and the mattress on the cubicle floor reduces the number of different steps that have to be completed to secure both the mattress and the brisket board, which consequently reduces the mounting cost.

BRIEF DESCRIPTION OF THE DRAWINGS

Exemplary embodiments of the present invention are illustrated in the appended figures, in which.

DETAILED DESCRIPTION OF THE INVENTION

Figure 1:
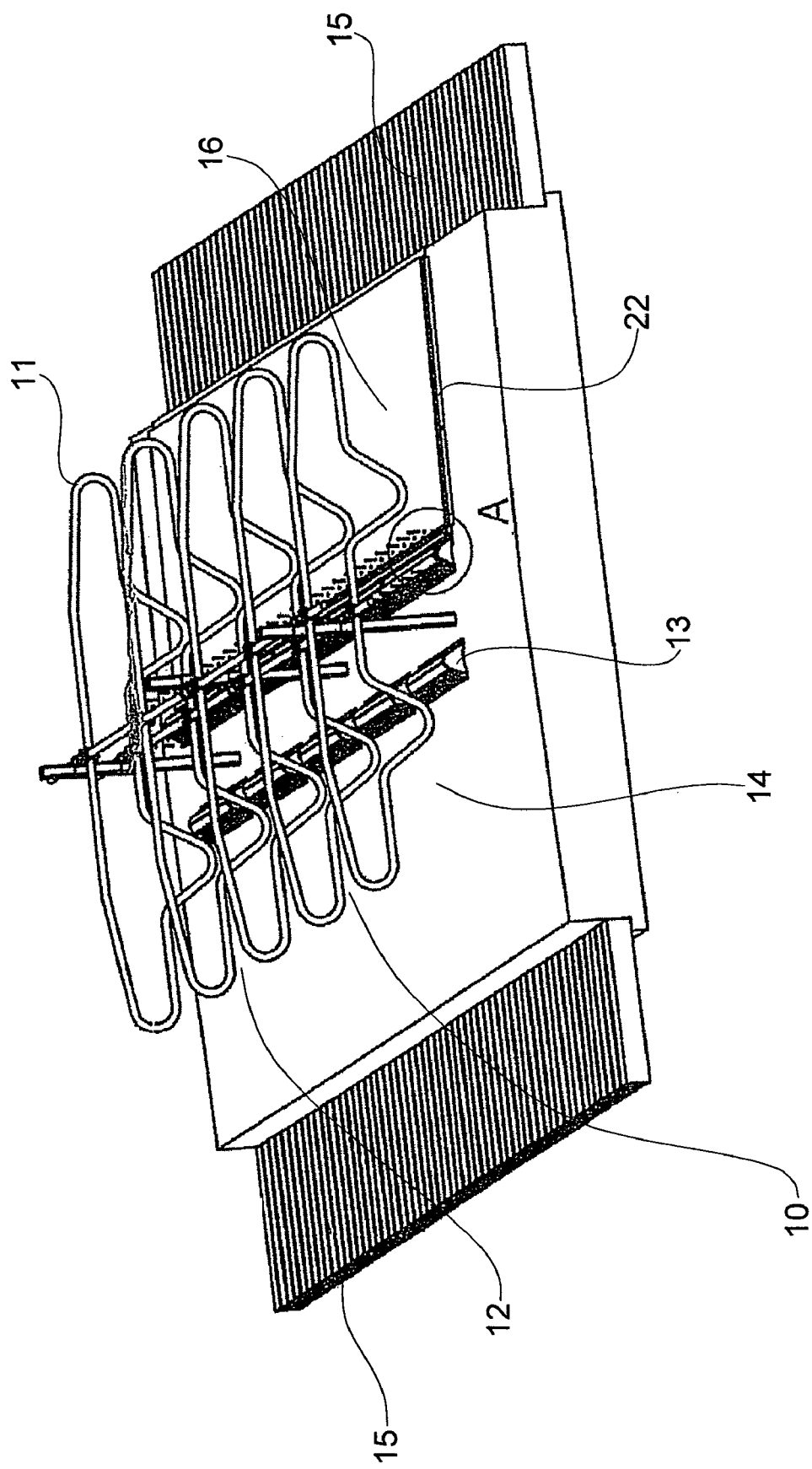
FIG. 1 illustrates a schematic perspective view of a number of cubicles arranged within a barn.

FIG. 1 discloses a number of cubicles 10 arranged within a not illustrated barn. The cubicles are delimited laterally by partitions, in this case elongated tubes 11 that are curved in order to provide an efficient barrier that separates the cubicles 10. Each cubicle is intended to be used by one animal, and the animal enters the cubicle via an open side 12 of the cubicle 10. A brisket board 13 is placed on the floor 14 and extends across the entire cubicle width in order to prevent that the animal moves to far into the cubicle. This is important to ensure that urine and defecate from the animal end up in the therefore intended area 15 outside the cubicle 10 where it is collected and removed on a regular basis.

The cubicle floor 14 is normally made of concrete. In order to increase the comfort for the animal, the resting area of the floor 14 is covered by a mattress 16.

Figure 2:
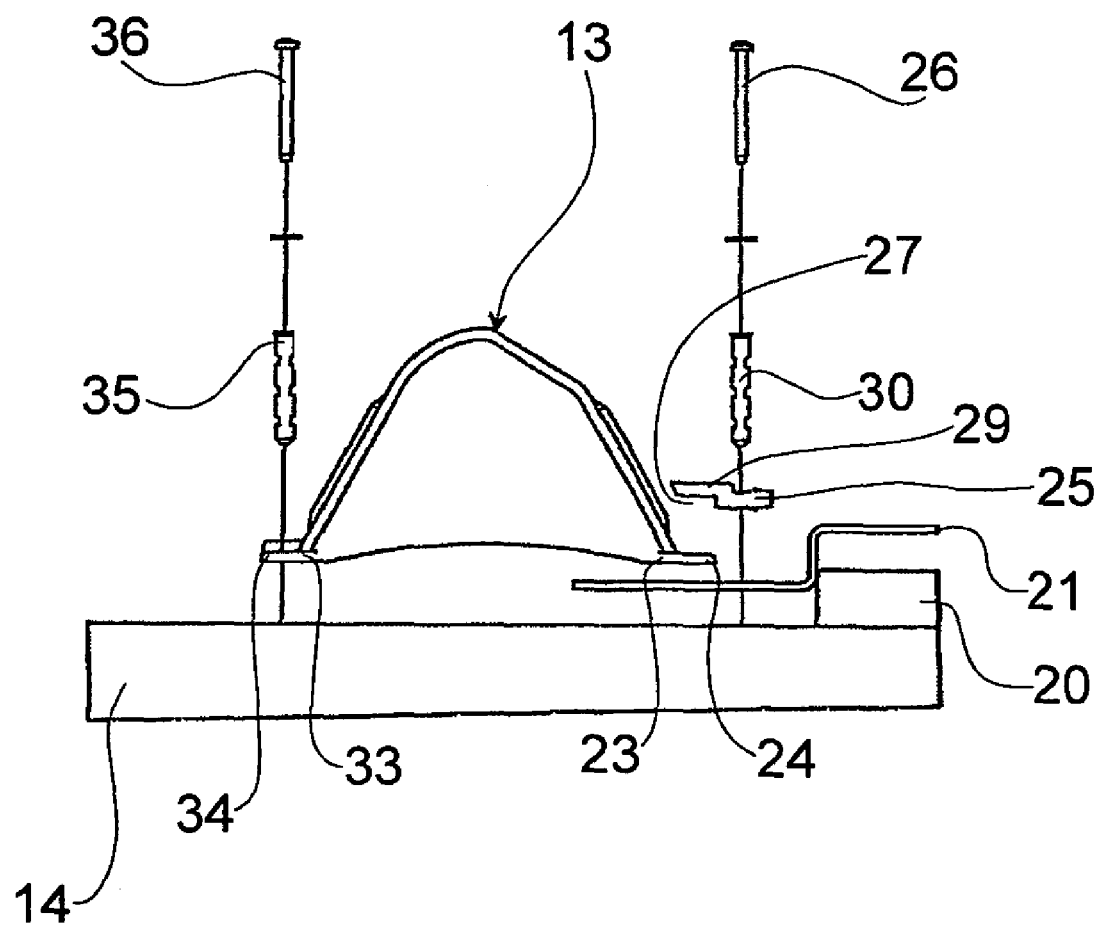
FIG. 2 illustrates a schematic side view of the arrangement according to the present invention.

In FIG. 2, a cross section of one exemplary embodiment of the present invention is disclosed. The cross section illustrates the arrangement in circle A in FIG. 1. The mattress 16 comprises a padding layer 20 placed on the cubicle floor 14. The padding layer 20 is kept in the intended position by a padding cover 21 placed on top of the padding layer 20. The padding cover 21 is slightly larger than the padding layer 20 so that it is can be secured to the cubicle floor 14 by elongated sections 22 (shown in FIG. 1) clamping the padding cover between the elongated section 22 and the floor 14 at sides of the mattress 16. The padding cover 21 is stretched over the padding layer 20 to keep the padding layer in the correct position on the floor 14.

A brisket board 13 with a substantially triangular cross section is placed on the cubicle floor 14 close to the animal head end of the mattress 16 with one of the sides towards to the floor 14. The edge 23 of the brisket board facing the mattress 16 is provided with a flange 24, or a number of singular protrusions 44 illustrated in FIG. 3b, extending outwards from the edge 23.

The side of the mattress 16 placed towards the brisket board 13 is secured to the floor 14 by an elongated profile 25. The profile 25 is securing the padding cover 21 to the floor 14 by clamping the padding cover 21 between the floor 14 and the profile 25. The profile 25 is screwed by at least two screws 26 and thereto needed concrete plugs 30 to the floor. The profile 25 could however also be secured by bolts or other suitable fixing elements to the floor 14. In the embodiment disclosed in FIG. 2, the padding cover 21 is extending beyond the profile so that the edge of the padding cover 21 will end under the brisket board 13. The profile 25 is shaped in such a way that a recess 27 is formed between the padding cover 21 covered surface of the floor 14 and the profile 25 on the side facing away from the mattress 16. The protruding flange 24 on the side of the brisket board 13 facing the profile 25 is fitted within the recess 27, and a second flange 34 along the other edge 33 of the brisket board 13 is secured to the floor 14 by at least two screws 34 and thereto needed plugs 35, extending through the second flange 34. The brisket board 13 is thereby secured in an easy way to the cubicle floor 14 since the flange 24 fitted within the recess 27 is prevented from disengagement of the profile 25.

The securing of the second flange 34 of the brisket board 13 to the floor could be done by other fixing elements instead of the illustrated screw 36.

Figure 3A:
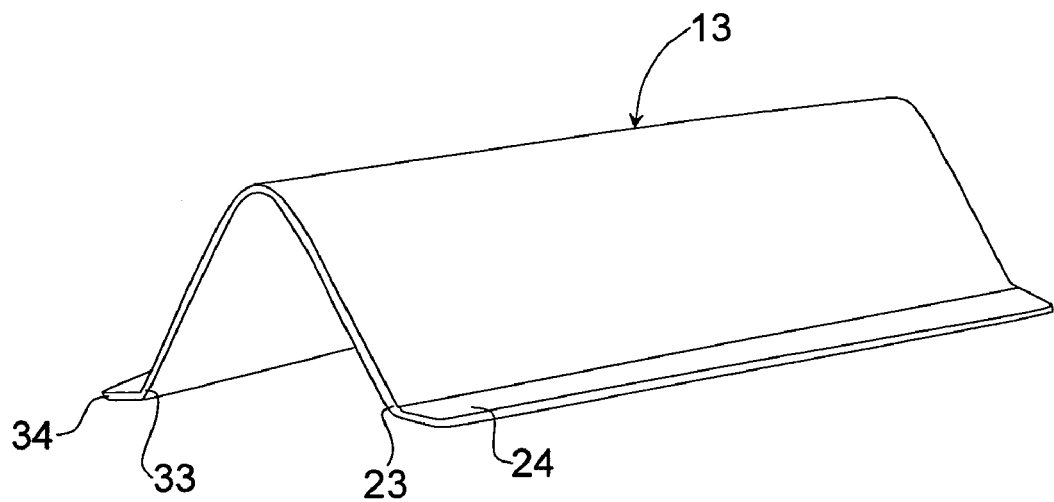
FIG. 3a illustrates a first embodiment of a brisket board.

In FIG. 3a, one exemplary embodiment of the substantially triangular brisket board is disclosed. The brisket board 13 is provided with an elongated flange 24 extending along the edge 23.

Figure 3B:
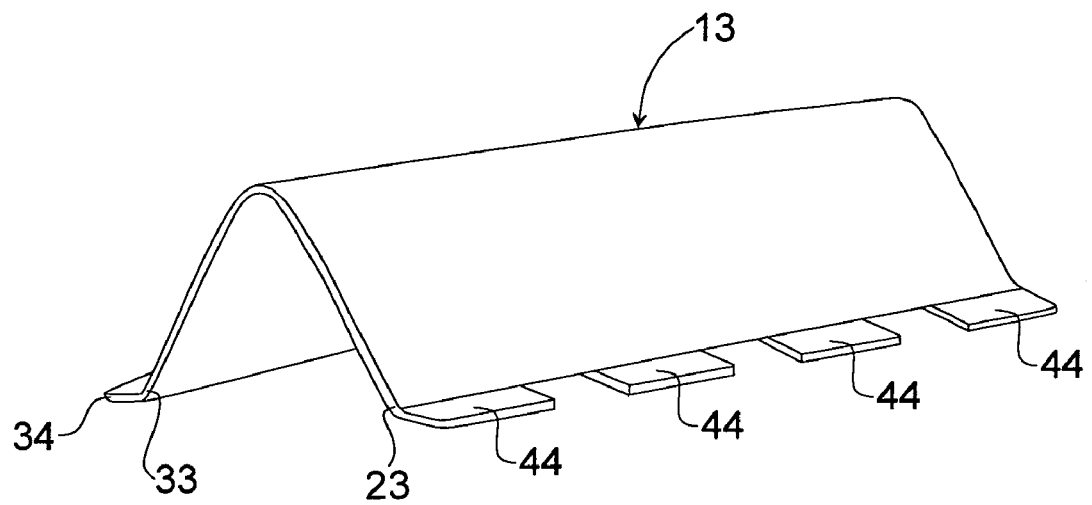
FIG. 3b illustrates a second embodiment of a brisket board.

A second exemplary embodiment of the brisket board 13 is illustrated in FIG. 3b. In this embodiment there are a number of singular protrusions 44 extending from the edge 23 instead of a full flange.

A third, not disclosed exemplary embodiment of the brisket board could be provided with a flange, or a number of singular protrusions, placed underneath an edge 23 of the brisket board, such that it does not protrude beyond the edge 23. When fitted in the recess 27, the brisket board 13 edge 23 will be arranged on top of the profile 25.

The brisket board could also have a different cross-sectional shape than triangular, for example rectangular or other suitable geometrical shape.

Figure 4:
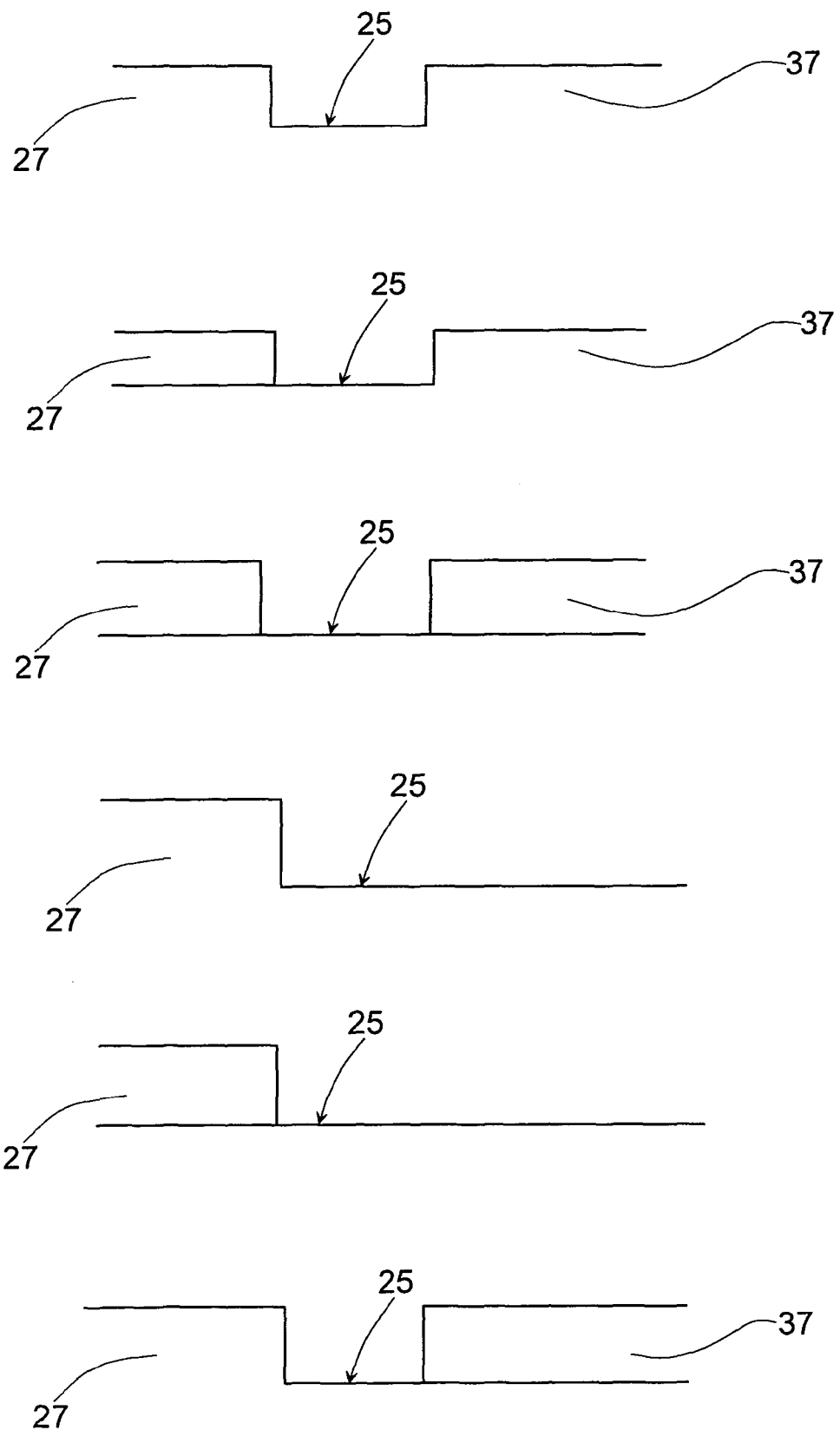
FIG. 4 illustrates the cross-section of different embodiments of the elongated profile.

Instead of a mattress 16 comprising a padding layer 20 and a padding cover 21, a mat comprising one single layer could be used. The mat is either clamped to the floor 14 by the profile 25 or fitted within a second recess 37 in the profile or generated by the profile. Different embodiments of the profile 25 cross section are illustrated in FIG. 4. All embodiments of the profile have, or generate, a recess 27 in which the brisket board flange 24 or protrusions 44 are fitted.

The profile 25 extends across substantially the entire cubicle 10. If there are cubicles placed side by side within the barn, the profile 25 preferably extend across more than one cubicle 10 in order to reduce the number of profiles 25 and different steps that have to be completed to mount the arrangement within the barn. Also, the brisket board 13 may extend across more than one cubicle.

The present invention should not be limited to the described embodiments, since these embodiments only serves as examples falling within the scope of the invention defined by the appended claims.

The invention claimed is:

1. A system for an arrangement in a cubicle (10) for an animal, the cubicle (10) having a floor (14), an open side (12) through which the animal enters the cubicle (10), and an opposite end for the animal head, said system comprising:

a mattress (16) placed on the cubicle floor (14);

a brisket board (13) for positioning the animal longitudinally within the cubicle (10); and an elongated profile (25) for securing one side of the brisket board (13) to the floor (14) of the cubicle (10) and for securing a head end of the mattress (16) to the floor (14) of the cubicle, the mattress having an outer perimeter, within the outer perimeter the mattress comprising the head end and a remaining portion extending away from the head end, the mattress being sized for having the animal lay thereon on the remaining portion, wherein, when installed in the cubicle, a longitudinal part of the head end of the mattress runs in a first direction, the head end of the mattress being secured to the floor by the elongated profile along the first direction, leaving the remaining portion of the mattress placed on the floor and unsecured to the floor, the outer perimeter of the remaining portion being unsecured to the floor, the brisket board comprises a substantially triangular cross section with a base of the triangular cross section having a first flange (24) and a spaced apart second flange (34), the first and second flanges running in the first direction, wherein, when installed in the cubicle, the head end of the mattress is located between the first flange (24) of the brisket board (13) and the floor, the head end of the mattress, the first flange (24), and the elongated profile (25) run in the first direction along a common line with the first flange (24) being located intermediate the elongated profile (25) and the head end of the mattress.

2. A system for an arrangement in a cubicle (10) for an animal, the cubicle (10) having a floor (14), an open side (12)

through which the animal enters the cubicle (10), and an opposite end for the animal head, said system comprising:
- a brisket board (13) for positioning the animal longitudinally within the cubicle (10);
- a mattress (16) placed on the cubicle floor (14); and
- an elongated profile (25) for securing one side of the brisket board (13) to the floor (14) of the cubicle (10) and for securing a head end of the mattress (16) to the floor (14) of the cubicle
- wherein the brisket board (13) comprises a substantially triangular cross section with a base of the triangular cross section having a first edge (23) and a spaced apart second edge (33), the first and second edges running in a first direction when installed in the cubicle,
- wherein the brisket board is further comprised of one of i) a first flange (24) and ii) singular first protrusions (44), extending from the brisket board along the first edge (23) of the brisket board (13)
- wherein, when installed in the cubicle,
- a longitudinal part of the head end of the mattress runs in the first direction, the head end of the mattress being secured to the floor at the first edge (23) by one of i) the first flange (24) and ii) the singular first protrusions (44) and by the elongated profile along the first direction, leaving a remaining portion of the mattress placed on the floor and unsecured to the floor, the outer perimeter of the remaining portion being unsecured to the floor and sized for the animal laying thereupon,
- wherein the head end of the mattress is located between i) the first edge (23), the one of the first flange (24) and the singular first protrusions (44), and ii) the floor, and
- wherein the head end of the mattress, the one of the first flange (24) and the singular first protrusions (44), and the elongated profile (25) run in the first direction along a common line with the one of the first flange (24) and the singular first protrusions (44) being located intermediate the elongated profile (25) and the head end of the mattress.

3. The system of claim 2, wherein the elongated profile (25) has a longitudinal side provided with or forming a recess (27) extending, in the first direction, along the longitudinal side of the elongated profile (25), and, when installed in the cubicle, the one of i) the first flange (24) and ii) the singular first protrusions (44) are fitted within the elongated profile recess (27).

4. The system of claim 2, further comprising:
- at least two first fastening means for securing the elongated profile (25) to the floor (14), the first fastening means extending through both the elongated profile and the head end of the mattress into the floor, wherein,
- the brisket board (13) is further comprised of one of i) a second flange (34) and ii) a number of singular second protrusions, extending from the brisket board along the second edge (33) of the brisket board (13), and
- the least two second fastening means, when installed in the cubicle, secure the one of the second flange (34) and the singular second protrusions to the floor (14), the second fastening means extending through the one of the second flange (34) and the singular second protrusions into the floor.

5. The system of claim 4, further comprising the mattress having a padding cover (21) stretched over a padding layer (20), the mattress having an outer perimeter, within the outer perimeter the mattress comprising the head end and a remaining portion extending away from the head end, the mattress being sized for having the animal lay thereon on the remaining portion, and wherein, when installed in the cubicle, a longitudinal part of the head end of the mattress runs in a first direction under the elongate profile and under the brisket board, the head end of the mattress secured to the floor by the elongated profile along the first direction and leaving the remaining portion of the mattress placed on the floor and unsecured to the floor, the outer perimeter of the remaining portion being unsecured to the floor.

6. A system for an arrangement in a cubicle (10) for an animal, the cubicle (10) having a floor (14), an open side (12) through which the animal enters the cubicle (10), and an opposite end for the animal head, said system comprising:
- a brisket board (13) for positioning the animal longitudinally within the cubicle (10); and
- an elongated profile (25) for securing one side of the brisket board (13) to the floor (14) of the cubicle (10) and for securing a head end of a mattress (16) to the floor (14) of the cubicle, the mattress having an outer perimeter, within the outer perimeter the mattress comprising the head end and a remaining portion extending away from the head end, the mattress being sized for having the animal lay thereon on the remaining portion, when installed in the cubicle, a longitudinal part of the head end of the mattress running in a first direction, the head end of the mattress being secured to the floor by the elongated profile along the first direction, wherein,
- the brisket board (13) comprises a substantially triangular cross section with a base of the triangular cross section having a first edge (23) and a spaced apart second edge (33), the first and second edges running in a first direction, wherein, when installed in the cubicle,
- the brisket board is further comprised of one of i) a first flange (24), and ii) singular first protrusions (44), extending from the brisket board along the first edge (23) of the brisket board (13),
- when installed in the cubicle, the one of i) the first flange (24) and ii) the singular first protrusions (44), extend from the brisket board along the first edge (23) of the brisket board (13), covering and securing the head end of the mattress to the floor of the cubicle.

7. The system of claim 6, further comprising fastening means, wherein,
- the elongated profile (25) has, in cross section, a recess (27) shaped and sized to extend over the one of i) the first flange (24), and ii) the singular first protrusions (44) fitted within the elongated profile recess (27), and
- when installed in the cubicle, the fastening means extend through the elongated profile and through the head end of the mattress into the floor to secure both the brisket board and the head end of the mattress to the floor.

8. A system for an arrangement in a cubicle (10) for an animal, the cubicle (10) having a floor (14), an open side (12) through which the animal enters the cubicle (10), and an opposite end for the animal head, said system comprising:
- a mattress;
- a brisket board (13) for positioning the animal longitudinally within the cubicle (10); and
- an elongated profile (25) for securing one side of the brisket board (13) to the floor (14) of the cubicle (10) and for securing a head end of the mattress (16) to the floor (14) of the cubicle, the mattress having an outer perimeter, within the outer perimeter the mattress comprising the head end and a remaining portion extending away from the head end, the mattress being sized for having the animal lay thereon on the remaining portion, when installed in the cubicle, a longitudinal part of the head end of the mattress running in a first direction, the head end of the mattress being secured to the floor by the elongated profile along the first direction, wherein, the brisket board (13) comprises a substantially triangular cross section with a base of the triangular cross section having a first edge (23) and a spaced apart second edge (33), the first and second edges running in a first direction, wherein, when installed in the cubicle, the brisket board is further comprised of one of i) a first flange (24), and ii) singular first protrusions (44), extending from the brisket board along the first edge (23) of the brisket board (13), when installed in the cubicle, the one of i) the first flange (24) and ii) the singular first protrusions (44), extend from the brisket board along the first edge (23) of the brisket board (13), covering and securing the head end of the mattress to the floor of the cubicle.

9. The system of claim 8, further comprising fastening means, wherein, the elongated profile (25) has, in cross section, a recess (27) shaped and sized to extend over the one of i) the first flange (24), and ii) the singular first protrusions (44) fitted within the elongated profile recess (27), and when installed in the cubicle, the fastening means extend through the elongated profile and through the head end of the mattress into the floor to secure both the brisket board and the head end of the mattress to the floor.

* * * * *